(12) United States Patent
Zhang

(10) Patent No.: US 10,936,138 B2
(45) Date of Patent: Mar. 2, 2021

(54) TOUCH DETECTION CIRCUIT AND THE METHOD OF DRIVING THE SAME

(71) Applicants: BEIJING BOE DISPLAY TECHNOLOGY CO., LTD., Beijing (CN); BOE TECHNOLOGY GROUP CO., LTD., Beijing (CN)

(72) Inventor: Kan Zhang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 342 days.

(21) Appl. No.: 16/087,389

(22) PCT Filed: Mar. 22, 2018

(86) PCT No.: PCT/CN2018/079948
§ 371 (c)(1),
(2) Date: Sep. 21, 2018

(87) PCT Pub. No.: WO2018/177185
PCT Pub. Date: Oct. 4, 2018

(65) Prior Publication Data
US 2021/0004100 A1    Jan. 7, 2021

(30) Foreign Application Priority Data

Apr. 1, 2017    (CN) .......................... 201710214503.2

(51) Int. Cl.
*G06F 3/046*    (2006.01)
*G06F 3/041*    (2006.01)

(52) U.S. Cl.
CPC ............ *G06F 3/046* (2013.01); *G06F 3/0412* (2013.01); *G06F 3/0414* (2013.01); *G06F 2203/04106* (2013.01)

(58) Field of Classification Search
CPC .... G06F 3/046; G06F 2203/014; G06F 3/016; G06F 3/0488; G06F 2203/04105;
(Continued)

(56) References Cited

U.S. PATENT DOCUMENTS

2015/0042363 A1    2/2015  Han

FOREIGN PATENT DOCUMENTS

| CN | 105589605 A | 5/2016 |
| CN | 105975121 A | 9/2016 |

(Continued)

OTHER PUBLICATIONS

First Office Action for CN Application No. 201710214503.2, dated Feb. 26, 2019.
(Continued)

*Primary Examiner* — Sanjiv D. Patel
(74) *Attorney, Agent, or Firm* — Dinsmore & Shohl LLP

(57) ABSTRACT

The present disclosure relates to a touch detection circuit, a driving method thereof, an embedded touch panel, and a display device. A touch detection circuit includes: a magnetic sensing circuit, a voltage input circuit, a voltage storage circuit, a piezoelectric sensing structure, a bottom gate type driving transistor, and a data processing circuit; wherein, by the cooperation of the above circuits and structures, the touch detection circuit can not only support the magnetic touch function based on the electromagnetic induction principle, but also can support the pressure sensing touch function based on the pressure sensing technology, thereby integrating the magnetic touch detection circuit with the pressure sensing device and the pressure sensing detection circuit in one touch detection circuit, and it is possible to reduce the excessive space in the display device occupied by the pressure sensing device and the pressure sensing detection circuit.

12 Claims, 7 Drawing Sheets

(58) Field of Classification Search
CPC .. G06F 3/0414; G06F 3/0416; G02F 1/13338; H01L 29/42316; H01L 27/20; H01L 41/04; H01L 29/0847
See application file for complete search history.

(56) References Cited

FOREIGN PATENT DOCUMENTS

| | | |
|---|---|---|
| CN | 106354345 A | 1/2017 |
| CN | 106980410 A | 7/2017 |

OTHER PUBLICATIONS

International Search Report and Written Opinion for Int. Appl. No. PCT/CN2018/079948, dated May 31, 2018.

S501 — In the magnetic touch phase, when the magnetic sensing module senses an external magnetic field, the magnetic sensing module generates a magnetic sensing voltage related to a direction of the magnetic field; the voltage input module supplies the signal of the first reference signal terminal to a first electrode of the driving transistor under the control of the scanning signal terminal; the voltage storage module provides a preset voltage to the gate of the driving transistor; the driving transistor outputs a magnetic detection current related to the voltage of the gate of the driving transistor; and the data processing module determines the magnetic touch position according to the comparison between the preset current and the received magnetic detection current.

↓

S502 — In the pressure sensing touch phase, when the piezoelectric sensing structure is deformed by a pressure, a pressure induced voltage for controlling a threshold voltage of the driving transistor is generated along the pressure direction; the voltage input module supplies the signal of the first reference signal terminal to the first electrode of the driving transistor under the control of the scanning signal terminal; the voltage storage module supplies a preset voltage to the gate of the driving transistor; the driving transistor outputs a pressure sensing detection current corresponding to the threshold voltage of the driving transistor; and the data processing module recOgnizes the pressure according to the comparison between the preset current and the received pressure sensing detection current.

Fig. 5

TOUCH DETECTION CIRCUIT AND THE METHOD OF DRIVING THE SAME

CROSS-REFERENCE TO RELATED APPLICATIONS

This application is a National Stage of International Application No. PCT/CN2018/079948, filed on Mar. 22, 2018, which claims priority to Chinese Patent Application No. 201710214503.2, filed on Apr. 1, 2017, both of which are hereby incorporated by reference in their entireties.

FIELD

The present disclosure relates to a field of display technology, and particularly to a touch detection circuit, a method of driving the same, an embedded touch panel and a display device.

BACKGROUND

With fast development of display technologies, touch panels have been widely used in people's daily life. Comparing with traditional displays which merely provide a displaying function, a display with the touch panel can enable information interactions between a user and a display control host.

SUMMARY

According to a first aspect of the present disclosure, there is provided a touch detection circuit comprising a driving transistor of bottom gate type, including a gate, a first electrode and a second electrode, wherein the second electrode outputs an magnetic detection current related to a voltage of the gate of the driving transistor during a magnetic touch phase, and outputs a pressure sensing detection current associated with a threshold voltage of the drive transistor during a pressure sensing touch phase; a piezoelectric sensing structure located on a side of an active layer of the driving transistor facing away from the gate of the driving transistor, wherein the piezoelectric sensing structure is configured to generate a pressure induced voltage, along a direction of a pressure, for controlling a magnitude of the threshold voltage of the driving transistor when the piezoelectric sensing structure is pressed and deformed; a magnetic sensing circuit electrically connected to the gate of the driving transistor, and configured to generate an electromagnetic induction voltage related to a direction of an external magnetic field when the magnetic sensing circuit senses the external magnetic field; a voltage input circuit, configured to provide a first reference signal to the first electrode of the driving transistor; a voltage storage circuit electrically connected to the gate of the drive transistor, and configured to provide a preset voltage to the gate of the driving transistor; and a data processing circuit electrically connected to the second electrode of the driving transistor, and configured to determine an magnetic touch position according to the preset current and the magnetic detection current, and to recognize the pressure according to the preset current and the pressure sensing detection current.

According to a second aspect of the present disclosure, there is provided an embedded touch panel including the touch detection circuit according to the first aspect of the present disclosure.

According to a third aspect of the present disclosure, there is provided a display device comprising the embedded touch panel according to the second aspect of the present disclosure.

According to a fourth aspect of the present disclosure, there is provided a method of driving the touch detection circuit according to the first aspect of the present disclosure, comprising: during the magnetic touch phase, generating the electromagnetic induction voltage related to the direction of the magnetic field when the magnetic sensing circuit senses the external magnetic field; providing, by the voltage input circuit, the first reference signal to the first electrode of the driving transistor; providing, by the voltage storage circuit, the preset voltage to the gate of the driving transistor; outputting, by the drive transistor, the magnetic detection current associated with the voltage of the gate of the driving transistor; and determining, by the data processing circuit, the magnetic touch position according to the preset current and the magnetic detection current; and during the pressure sensing touch phase, generating a pressure induced voltage for controlling the threshold voltage of the driving transistor in the direction of the pressure when the piezoelectric sensing structure is deformed by the pressure; providing, by the voltage input circuit, the first reference signal to the first electrode of the driving transistor; providing, by the voltage storage circuit, the preset voltage to the gate of the driving transistor; outputting, by the drive transistor, the pressure sensing detection current associated with the threshold voltage of the driving transistor; and recognizing, by the data processing circuit, the pressure based on the preset current and the pressure sensing detection current.

BRIEF DESCRIPTION OF THE DRAWINGS

FIG. 3a schematically shows a detailed structure of the touch detection circuit of FIG. 1a.

FIG. 4 is a timing diagram of the input/output of the touch detection circuit of FIG. 3a.

FIG. 5 is a flow chart of a driving method according to an embodiment of the present disclosure.

DETAILED EMBODIMENTS

The specific embodiments of the touch detection circuit, the driving method thereof, the embedded touch panel and the display device provided by the embodiments of the present disclosure are described in detail below with reference to the accompanying drawings. The preferred embodiments described below are to be construed as illustrative only and not to limit the disclosure. And in the case of no conflict, the embodiments in the present disclosure and the features in the embodiments can be combined with each other.

The touch panel can completely or at least partially replace the commonly used input device, so that the existing display can not only display but also be touch controlled. Touch panels can be generally classified into resistive touch panels, capacitive touch panels, and electromagnetic touch panels. The electromagnetic touch panel can use a specific electromagnetic pen to emit a magnetic field, so that the electromagnetic induction coil on the electromagnetic touch panel generates a change in magnetic field, and generates a weak current, thereby calculating a touch position according to the generated weak current. That is, the electromagnetic touch panel can only recognize touch position without recognizing the direction of the magnetic field.

Pressure sensing technology refers to the technology that can detect external forces. This technology is used in industrial control, medical and other fields. At present, those skilled in the art are actively studying the application of pressure sensing technology to portable electronic display devices such as mobile phones or tablets to improve touch precision. However, the display device implementing the pressure sensing technology detects the change of the capacitance value on a pressure sensing device by additionally providing the pressure sensing device and an additional integrated pressure sensing detecting chip in the display device, so as to implement the pressure sensing touch function. Thereby the display device needs additional space to dispose the pressure sensing device and the pressure sensing detecting chip, resulting in increased complexity and cost of the display device, which is disadvantageous for the wide application of pressure sensing technology in the display field, especially in portable electronic display devices.

Figure 1A:
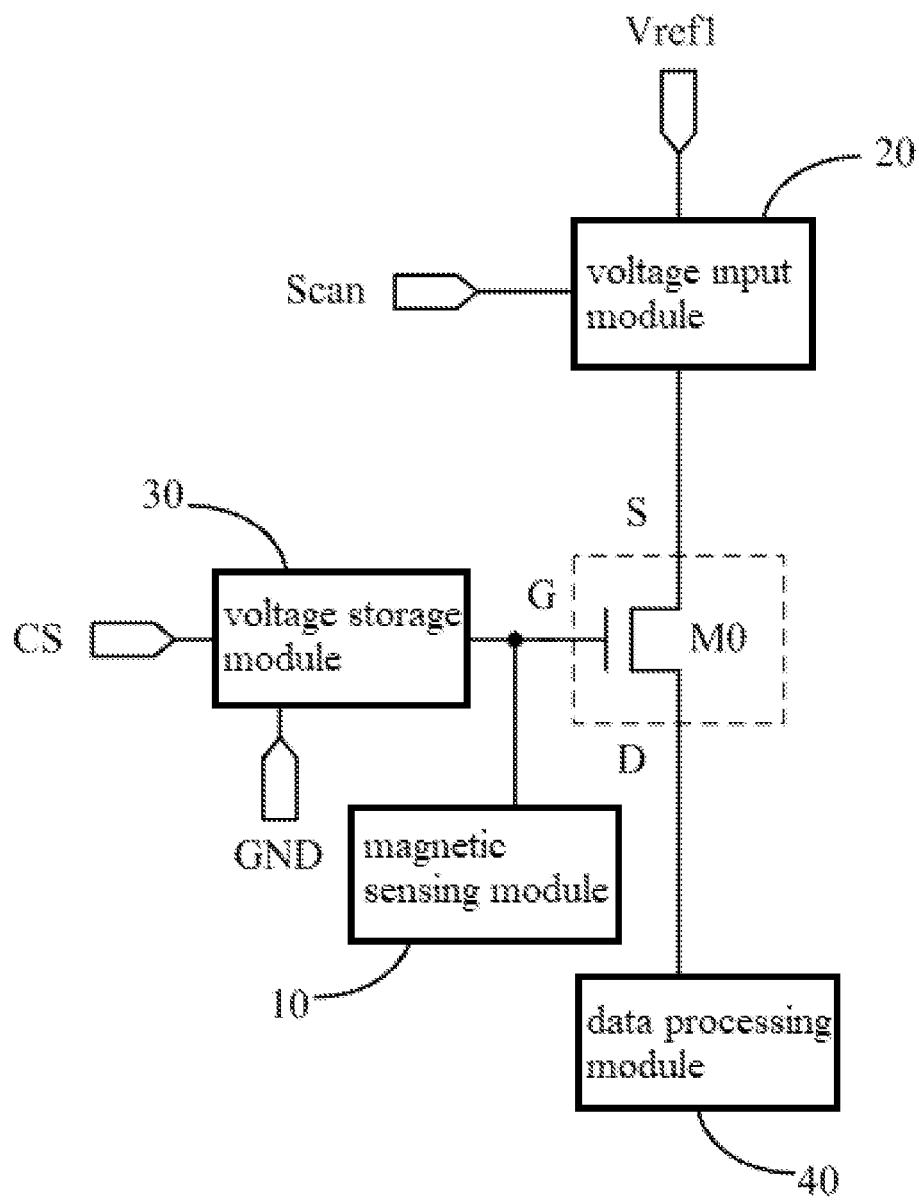
FIG. 1a schematically shows a structure of a touch detection circuit according to an embodiment of the present disclosure.
Figure 1B:
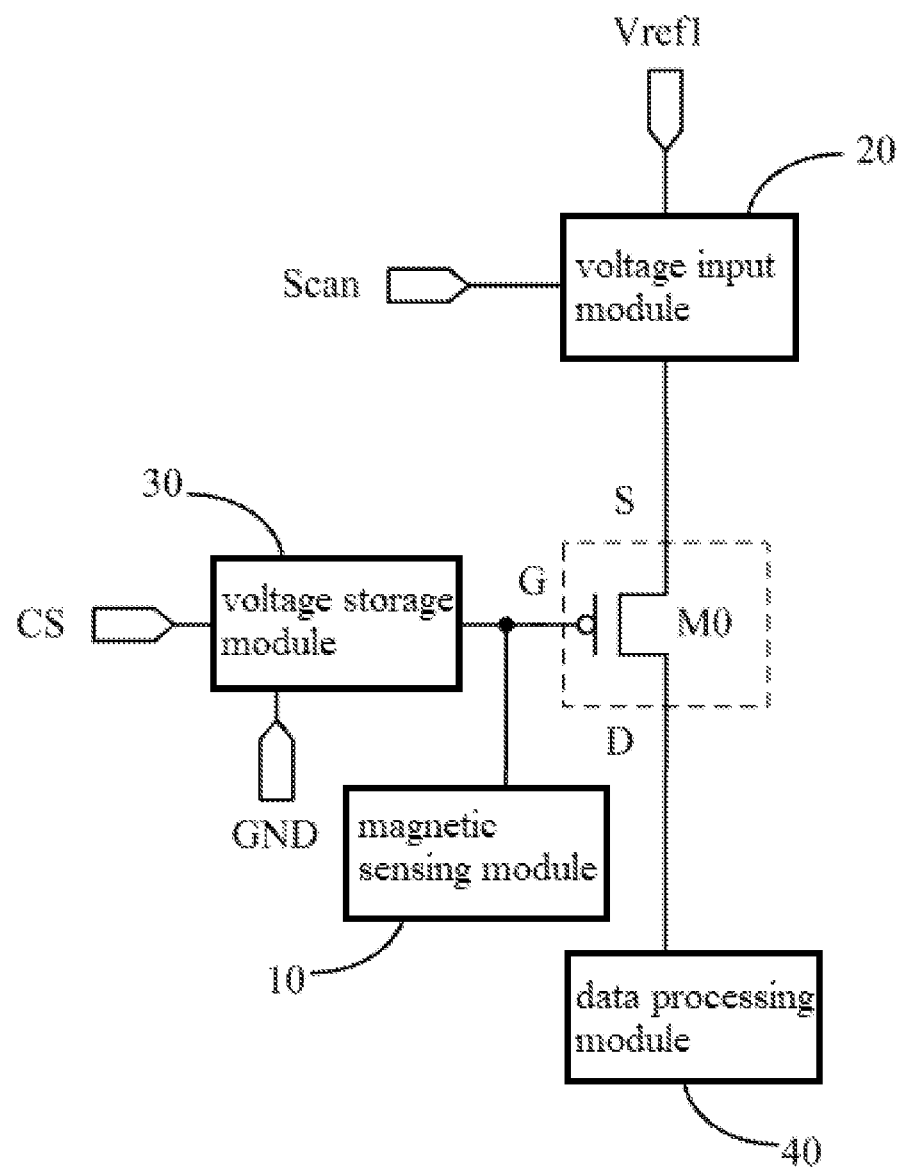
FIG. 1b schematically shows a structure of a touch detection circuit according to an embodiment of the present disclosure.

The embodiment of the present disclosure provides a touch detection circuit, as shown in FIG. 1a and FIG. 1b, including: a magnetic sensing circuit 10, a voltage input circuit 20, a voltage storage circuit 30, and a piezoelectric sensing structure (not shown in FIG. 1a and FIG. 1b), a driving transistor M0 of bottom gate type, a data processing circuit 40. The piezoelectric sensing structure is located on a side of the active layer of the driving transistor M0 that faces away from the gate G of the driving transistor M0, and the piezoelectric sensing structure is configured to generate a pressure induced voltage for controlling a threshold voltage of the driving transistor along the pressure direction when the piezoelectric sensing structure is subjected to pressure and deforms in a pressure sensing touch phase.

The magnetic sensing circuit 10 is electrically connected to the gate G of the driving transistor M0 for generating an electromagnetic induction voltage related to the direction of the magnetic field when an external magnetic field is sensed during a magnetic touch phase.

The voltage input circuit 20 is electrically connected to a scan signal terminal Scan, a first reference signal terminal Vref1, and a first electrode S of the driving transistor M0, respectively, for supplying a signal of the first reference signal terminal Vref1 to the first electrode S of the driving transistor M0 under the control of the scan signal terminal Scan during the magnetic touch phase and the pressure sensing touch phase.

The voltage storage circuit 30 is electrically connected to a pre-charge signal terminal CS, the gate G of the driving transistor M0, and the ground GND, respectively, for supplying a preset voltage to the gate G of the driving transistor M0 during the magnetic touch phase and the pressure sensing touch phase.

The second electrode D of the driving transistor M0 is electrically connected to the data processing circuit 40 for outputting an magnetic detection current related to a voltage of the gate G of the driving transistor M0 during the magnetic touch phase, and outputting a pressure sensing detection current related to a threshold voltage of the driving transistor M0 during the pressure sensing touch phase.

The data processing circuit 40 is configured to determine an magnetic touch position by comparing the received magnetic detection current with a preset current during the magnetic touch phase, and recognize the pressure by comparing the received pressure sensing detection current and a preset current during the pressure sensing touch phase.

The touch detection circuit provided by an embodiment of the present disclosure includes: a magnetic sensing circuit, a voltage input circuit, a voltage storage circuit, a piezoelectric sensing structure, a driving transistor of bottom gate type, and a data processing circuit. The piezoelectric sensing structure is located at a side of the active layer of the driving transistor that faces away from the side of the gate of the driving transistor, and the piezoelectric sensing structure is configured to generate a pressure induced voltage for controlling the threshold voltage of the driving transistor along the pressure direction when the piezoelectric sensing structure is pressed and deformed during the pressure sensing touch phase. The magnetic sensing circuit is configured to generate an electromagnetic induction voltage related to a direction of an external magnetic field when the external magnetic field is sensed during the magnetic touch phase. The voltage input circuit is configured to, during the magnetic touch phase and the pressure sensing touch phase, under the control of the scanning signal terminal, provide the signal of the first reference signal terminal to the first electrode of the driving transistor. The voltage storage circuit is configured to provide a preset voltage to the gate of the driving transistor during the magnetic touch phase and the pressure sensing touch phase. The driving transistor is configured to output an magnetic detection current associated with the voltage of the gate of the driving transistor during the magnetic touch phase, and output a pressure sensing detection current related to the threshold voltage of the driving transistor during pressure sensing touch phase. The data processing circuit is configured to determine an magnetic touch position by comparing the preset current with the received magnetic detection current during the magnetic touch phase, and recognize the pressure by comparing the preset current and the received pressure sensing detection current during the pressure sensing touch phase. Therefore, with the cooperation of the above circuits and structures, the touch detection circuit can not only support the magnetic touch function based on the electromagnetic induction principle but also the pressure sensing touch function based on the pressure sensing technology, so that the magnetic touch detection circuit, the pressure sensing device and the pressure sensing detection circuit can be integrated in one touch detecting circuit, thereby preventing the pressure sensing device and the pressure sensing detecting circuit from occupying too much space in the display device.

Figure 2:
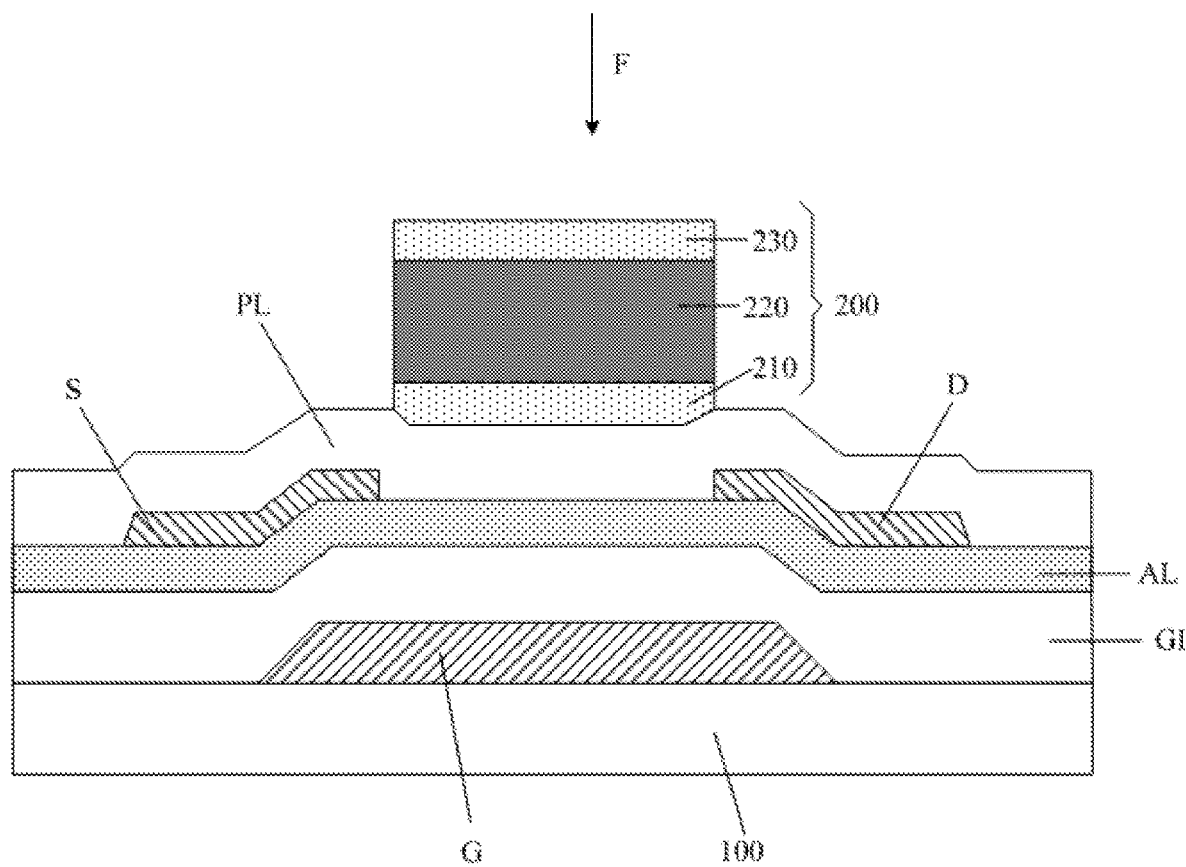
FIG. 2 schematically shows a piezoelectric sensing structure according to an embodiment of the present disclosure.

In an actual fabrication process, a driving transistor is generally formed on a substrate by a plurality of photolithography processes. In a specific implementation, in the touch detection circuit provided by an embodiment of the present disclosure, as shown in FIG. 2, a specific structure of the bottom gate type driving transistor may include: a gate G located on one side of the substrate 100, a gate insulating layer GI located at a side of the gate G facing away from the substrate 100, and an active layer AL on the side of the gate insulating layer GI facing away from the substrate 100, a first electrode S and a second electrode D located on a side of the active layer AL facing away from the substrate 100 and disposed in the same layer. The above is only a specific structure of the bottom gate type driving transistor provided by the embodiment of the present disclosure. In a specific implementation, the specific structure of the bottom gate type driving transistor is not limited to the above structure provided by the embodiment of the present disclosure, and may also be other structures known to those skilled in the art and is not limited herein.

In a specific implementation, in the above touch detection circuit provided by the embodiment of the present disclosure, as shown in FIG. 2, the piezoelectric sensing structure 200 is located on a side of the active layer AL of the driving transistor facing away from the gate G of the driving transistor. Specifically, a passivation layer PL is generally disposed between the piezoelectric sensing structure 200 and the active layer AL of the driving transistor. And the piezoelectric sensing structure 200 can generate a pressure induced voltage for controlling the threshold voltage of the driving transistor along the direction of pressure F when the piezoelectric sensing structure 200 is pressed and deformed during the pressure sensing touch phase. Due to the effect of the pressure induced voltage, electrons or holes in the active layer AL of the driving transistor are directionally moved, so that the threshold voltage of the driving transistor can be controlled. In practical applications, the piezoelectric sensing structure 200 can be disposed as a separate structure on the side of the active layer AL of the driving transistor facing away from the gate G of the driving transistor. Alternatively, the piezoelectric sensing structure 200 can also be a top gate of the driving transistor and located on the side of the active layer AL facing away from the gate G of the driving transistor, which is not limited herein.

In one embodiment of the present disclosure, in the touch detection circuit provided by the embodiment of the present disclosure, the piezoelectric sensing structure reduces the threshold voltage of the driving transistor when the piezoelectric sensing structure is pressed and deformed during the pressure sensing touch phase.

In a specific embodiment of the present disclosure, in the above-described touch detection circuit provided by the embodiment of the present disclosure, as shown in FIG. 2, the piezoelectric sensing structure 200 may specifically include: a first electrode 210, a piezoelectric material layer 220 and a second electrode 230 that are stacked. When the piezoelectric material layer 220 is deformed by the pressure, the first electrode 210 and the second electrode 230 respectively generate an equal amount of different charges, and the larger the deformation is, the more electric charges are generated. The piezoelectric material layer may specifically include: a piezoelectric crystal material, a piezoelectric ceramic material, a piezoelectric polymer material or a composite piezoelectric material. For example, the piezoelectric polymer material may be P(VDF-TrFE). Of course, the piezoelectric material layer may also be other piezoelectric materials having a piezoelectric function, which is not limited herein. Moreover, the thickness and shape of each layer of the films in the drawings do not reflect the true ratio of the driving transistor and the piezoelectric sensing structure 200 in the actual application setting, and the purpose is only to illustrate the present disclosure.

In a specific embodiment of the present disclosure, in the touch detection circuit provided by the embodiment of the present disclosure, the material of the first electrode is a transparent conductive material; and/or the material of the second electrode is a transparent conductive material. In a specific implementation, the transparent conductive material may be, for example, an indium tin oxide (ITO) material, an indium zinc oxide (IZO) material, nano gold, nano silver, carbon nanotubes, or a graphene, which is not limited herein.

In a specific touch detection circuit provided by the embodiment of the present disclosure, as shown in FIG. 1a, the driving transistor M0 may be an N-type transistor, and the drain of the N-type transistor serves as a first electrode S of driving transistor M0, and the source serves as the second electrode D of the driving transistor M0. When the relationship between the voltage difference $V_{gs}(M0)$ between the gate G and the first electrode S of the driving transistor M0 and its threshold voltage $V_{th}(M0)$ satisfies a formula: $V_{gs}(M0)>V_{th}(M0)$, the driving transistor M0 is turned on and in a saturated state. According to the current characteristics in the saturation state, current I flowing out of the second electrode D of the driving transistor M0 satisfies the formula: $I=K[V_{gs}(M0)-V_{th}(M0)]^2$, where K is a structural parameter, and the value of K is relatively stable in the same structure and can be regarded as a constant. Alternatively, as shown in FIG. 1b, the driving transistor M0 may be a P-type transistor having a source as a first electrode S of the driving transistor M0 and a drain as a second electrode D of the driving transistor M0. Further, when the relationship between the voltage difference $V_{gs}(M0)$ between the gate G and the first electrode S of the driving transistor M0 and its threshold voltage $V_{th}(M0)$ satisfies the formula: $V_{gs}(M0)<V_{th}(M0)$, the driving transistor M0 is turned on and is in a saturated state. According to the current characteristics in the saturation state, the current I flowing out of the second electrode D of the driving transistor M0 satisfies the formula: $I=K[V_{gs}(M0)-(M0)]^2$, where K is a structural parameter, and the value of K is relatively stable in the same structure and can be regarded as a constant.

In a specific embodiment of the present disclosure, in the touch detection circuit provided by the embodiment of the present disclosure, when the driving transistor is an N-type transistor, the voltage $V_{ref1}$ of the signal of the first reference signal terminal and the voltage $V_{CS}$ of the pre-charge signal terminal satisfy the formula: $V_{CS}-V_{ref1}>V_{th}(M0)$. When the driving transistor is a P-type transistor, the voltage $V_{ref1}$ of the signal of the first reference signal terminal and the voltage $V_{CS}$ of the pre-charge signal terminal satisfy the formula: $V_{CS}-V_{ref1}<V_{th}(M0)$.

In general electromagnetic touch technology, an electromagnetic pen is often used to generate a magnetic field, and the electromagnetic pen can perform a function of emitting magnetic fields in different directions by performing N-pole and S-pole transformations therein. In combination with the current formula that the driving transistor satisfies in the saturated state, when the electromagnetic touch and the pressure sensing touch are not occurred, the current flowing out of the second electrode of the driving transistor may be $I=K[V_{gs}(M0)-V_{th}(M0)]^2$, and is the same as the preset current. In the magnetic touch phase, since the magnetic sensing circuit generates an electromagnetic induction voltage related to the direction of the magnetic field when it senses the magnetic field generated by the electromagnetic pen, and the electromagnetic induction voltage is supplied to the gate of the driving transistor, thereby the magnitude of the gate voltage of the driving transistor can be changed, and further changes the magnitude of the current flowing out of the second electrode of the driving transistor. The changed current flowing out of the second electrode of the driving transistor is the magnetic detection current. Therefore the data processing circuit can determine the magnetic touch position by comparing the preset current and the received magnetic detection current. Or, in the pressure sensing touch phase, when an object presses and triggers the pressure sensing touch, since the pressure sensing structure will generate a pressure induced voltage along the direction of the pressure when the pressure sensing structure is pressed and deformed, and the generated pressure induced voltage will act on the active layer of the driving transistor according to the specific structures of the pressure sensing structure and the driving transistor. The threshold voltage of the driving transistor can be controlled, and the magnitude of the current flowing out of the second electrode of the driving transistor can be changed. The changed current flowing out of the second electrode of the driving transistor is the pressure sensing detection current, and the pressure can be recognized by the data processing circuit by comparing the preset current and the received pressure sensing detection current.

In practical applications, the magnetic sensing circuit is disposed in the touch panel, and the electromagnetic pen can realize emission of a magnetic field in different directions by performing N-pole and S-pole transformations therein. When the electromagnetic pen generates a magnetic field in a direction away from the magnetic emission end thereof, the direction of the magnetic field sensed by the magnetic sensing circuit is perpendicular and pointed toward the plane of the touch panel. When the electromagnetic pen generates a magnetic field facing the magnetic emission end, the direction of the magnetic field sensed by the magnetic sensing circuit is perpendicular and pointed outward from the touch panel. Since the direction of the magnetic field is different, the direction of the induced electromotive force generated by the magnetic sensing circuit is also different. Therefore, in a specific embodiment of the present disclosure, in the touch detection circuit provided by the embodiment of the present disclosure, the data processing circuit can also be configured to determine, during the magnetic touch phase, the direction of the magnetic field by comparing the preset current and the received magnetic detection current. Therefore, the direction of the magnetic field can be determined, and thus two different touch commands can be realized.

The present disclosure will be described in detail below in conjunction with specific embodiments. It should be noted that the present disclosure is intended to better explain the present disclosure, rather than limit the disclosure.

Figure 3A:
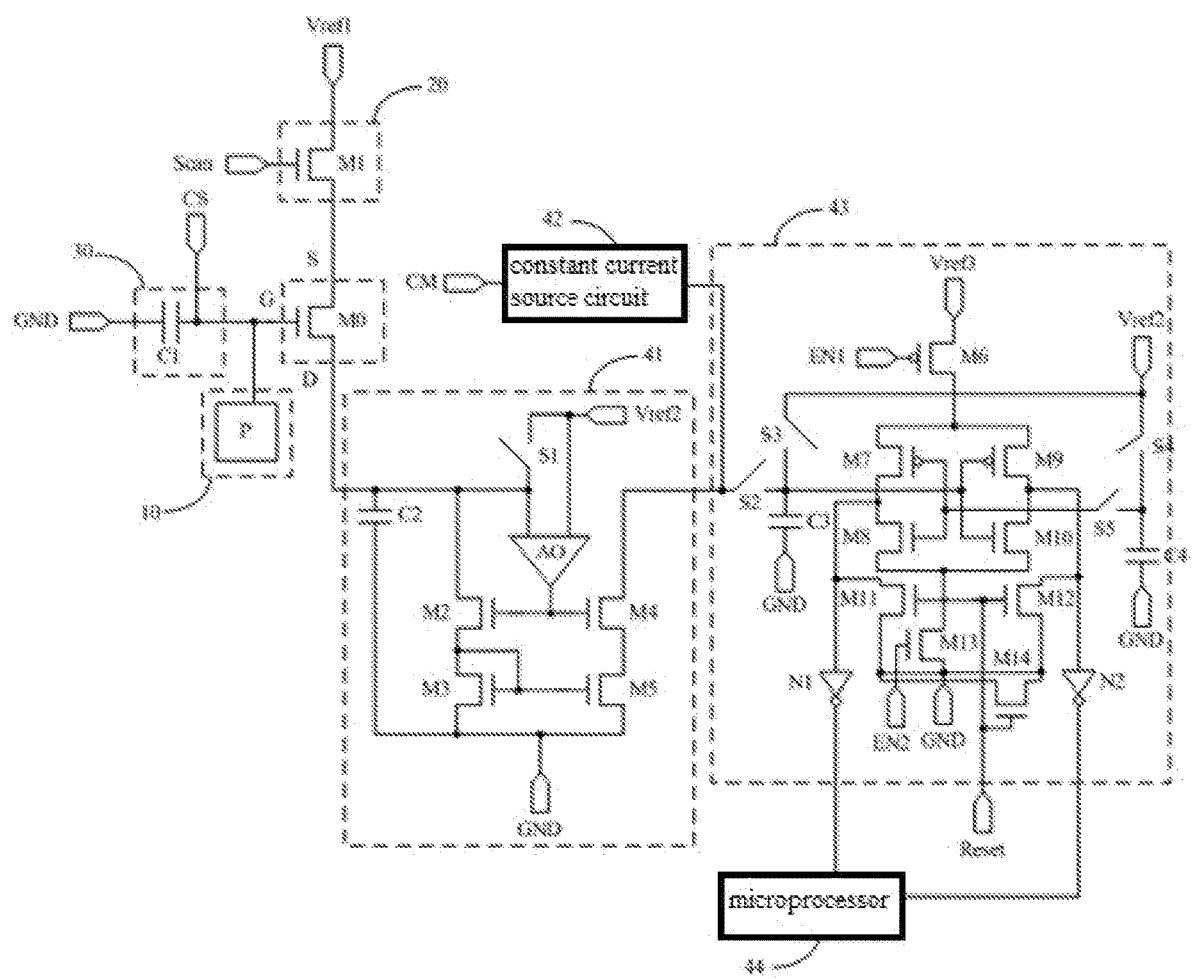
Figure 3B:
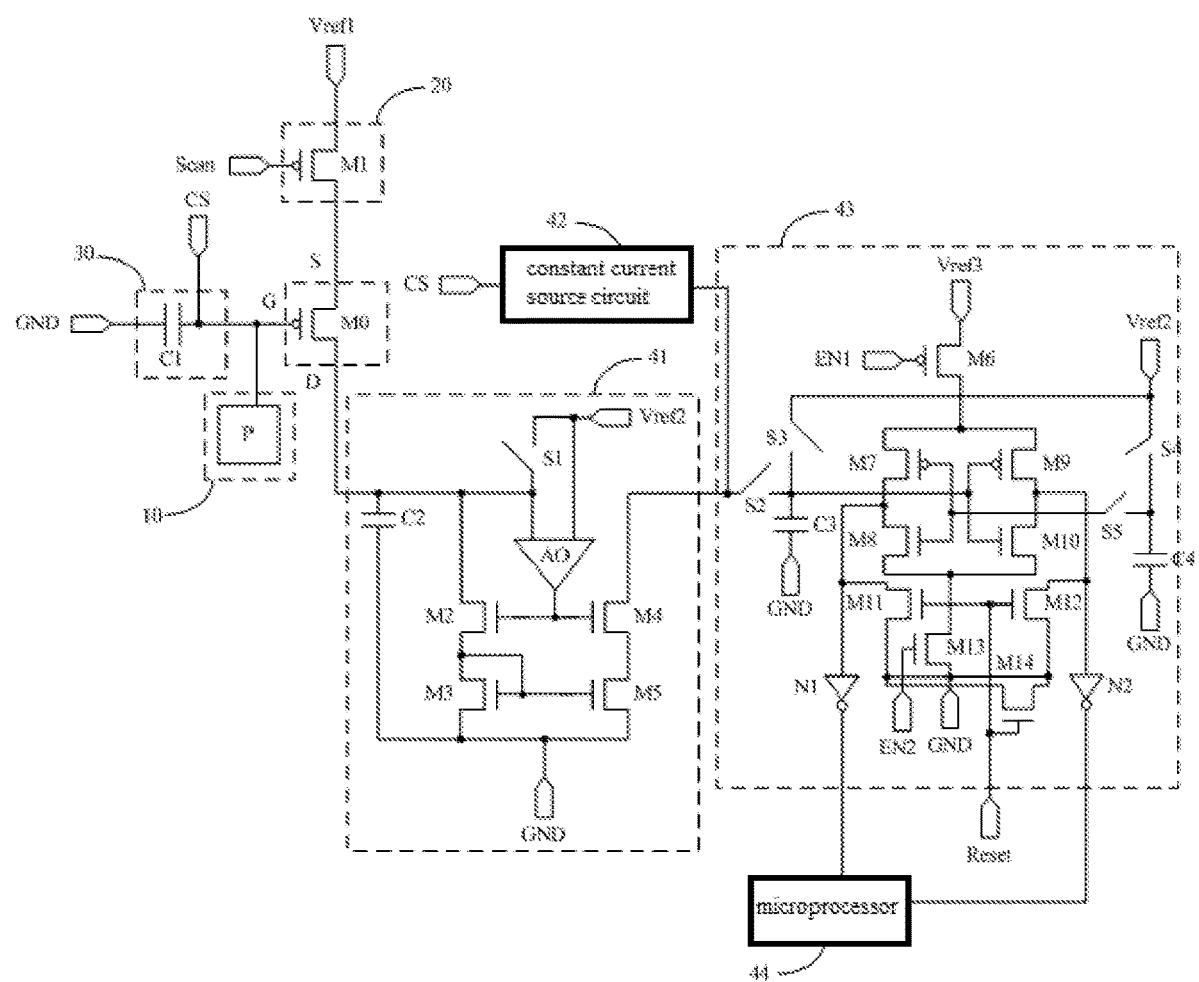
FIG. 3b schematically shows a detailed structure of the touch detection circuit of FIG. 1b.

Specifically, in an embodiment of the present disclosure, in the touch detection circuit provided by the embodiment of the present disclosure, as shown in FIG. 3a and FIG. 3b, the voltage input circuit 20 may specifically include: a first switching transistor M1.

The gate of the first switching transistor M1 is electrically connected to the scan signal terminal Scan, the first electrode of the first switching transistor M1 is electrically connected to the first reference signal terminal Vref1, and the second electrode of the first switching transistor M1 is coupled to a first electrode S of the driving transistor M0.

In one embodiment of the present disclosure, in the touch detection circuit provided by the embodiment of the present disclosure, as shown in FIG. 3a, the first switching transistor M1 may be an N-type switching transistor. Alternatively, as shown in FIG. 3b, the first switching transistor M1 may be a P-type switching transistor, which is not limited herein.

In a specific embodiment of the present disclosure, in the touch detection circuit provided by the embodiment of the present disclosure, when the first switching transistor M1 is turned on under the control of the scanning signal terminal Scan, the signal of the first reference signal terminal Vref1 is supplied to the first electrode S of the driving transistor M0.

Specifically, in one embodiment of the present disclosure, in the touch detection circuit provided by the embodiment of the present disclosure, as shown in FIG. 3a and FIG. 3b, the voltage storage circuit 30 may specifically include: a first capacitor C1.

A first end of the first capacitor C1 is electrically connected to the gate G of the driving transistor M0 and a pre-charge signal terminal CS, and the second end is electrically connected to the ground GND.

In an embodiment of the present disclosure, in the touch detection circuit provided by the embodiment of the present disclosure, the pre-charge signal terminal CS can input a voltage signal having a preset voltage to the first capacitor C1 at the beginning of displaying each frame under the control of an external control circuit, so that the first capacitor C1 is charged to the preset voltage. Then the pre-charge signal terminal CS receives no input of any voltage signal, that is, the first end of the first capacitor C1 is disconnected from the pre-charged signal terminal CS and is only electrically connected to the gate G of the driving transistor M0. Therefore, the pre-charge signal terminal CS can input a preset voltage to the gate G of the driving transistor M0, or the first capacitor C1 may input a predetermined voltage to the gate G of the driving transistor M0 in the magnetic touch phase and the pressure sensing touch phase. Of course, it is also possible to provide a switching transistor (not shown) between the pre-charge signal terminal CS and the first terminal of the first capacitor C1 to control the input of the signal of the pre-charge signal terminal CS, which is not limited herein.

Specifically, in one embodiment of the present disclosure, in the touch detection circuit provided by the embodiment of the present disclosure, as shown in FIG. 3a and FIG. 3b, the magnetic sensing circuit 10 may specifically include: a magnetic sensing plate P.

The output terminal of the magnetic sensing plate P is electrically connected to the gate G of the driving transistor M0.

In an embodiment of the present disclosure, in the touch detection circuit provided by the embodiment of the present disclosure, when the direction of the external magnetic field is perpendicular and pointed toward the magnetic sensing plate P, the magnetic sensing plate P generates an induced electromotive force in a direction opposite to gate voltage G of the driving transistor M0, reducing the gate voltage of the driving transistor M0 and thereby reducing the current output from the second electrode D of the driving transistor M0. Alternatively, when the direction of the external magnetic field is perpendicular and pointed outward from the magnetic sensing plate P, the magnetic induction sheet P generates the induced electromotive force in the same direction as that of the gate voltage of the driving transistor M0. Thereby, the gate voltage of the driving transistor M0 is increased, and the current output from the second electrode D of the driving transistor M0 is increased.

In an embodiment of the present disclosure, in the touch detection circuit provided by the embodiment of the present disclosure, the magnetic sensing plate P may be, for example, an electromagnetic coil. In practical applications, the specific structure of the magnetic sensing plate P needs to be designed and determined according to the specific application environment.

Specifically, in an embodiment of the present disclosure, in the touch detection circuit provided by the embodiment of the present disclosure, as shown in FIG. 3a and FIG. 3b, the data processing circuit 40 may specifically include: a current mirror circuit 41, and a constant current source circuit 42, a current comparing circuit 43, and a microprocessor 44.

An input end of the current mirror circuit 41 is electrically connected to the second electrode D of the driving transistor M0. An output end of the current mirror circuit 41 is electrically connected to a first output end of the current comparing circuit 43. The current mirror circuit 41 is configured to receive, in the magnetic touch phase, an magnetic detection current and copy the received magnetic detection current to the output end of the current mirror circuit 41 according to a preset ratio; receive, during the pressure sensing touch phase, a pressure sensing detection current, and copying the received pressure sensing detection current to the output end of the current mirror circuit 41a according to a preset ratio.

The input end of the constant current source circuit 42 is electrically connected to the constant current control signal terminal CS, and the output end of the constant current source circuit 42 is electrically connected to the input end of the current comparing circuit 43; the constant current source circuit 42 is configured to output, in the magnetic touch phase and the pressure sensing touch phase respectively, the preset current under the control of the constant current control signal terminal CS.

The second output end of the current comparing circuit 43 is electrically connected to the microprocessor 44 for outputting, during the magnetic touch phase, the first output signal and the second output signal to the microprocessor 44 according to the comparison between the received magnetic detection current and the preset current; and outputting, during the pressure sensing touch phase, a third output signal and a fourth output signal to the microprocessor 44 according to the comparison between the received pressure sensing detection current and the preset current.

The microprocessor 44 is configured to determine, during the magnetic touch phase, the magnetic touch position and the direction of the magnetic field according to the levels of the received first and second output signals, and recognize the pressure according to the levels of the received third and fourth output signals during the pressure sensing touch phase.

In an embodiment of the present disclosure, in the above touch detection circuit as provided by the embodiment of the present disclosure, the specific structure and function of the current mirror circuit 41, the constant current source circuit 42, the current comparing circuit 43, and the microprocessor 44 may be the same as those of the prior art, and should be understood by those of ordinary skill in the art, and are not described herein.

Specifically, in an embodiment of the present disclosure, in the touch detection circuit provided by the embodiment of the present disclosure, as shown in FIG. 3a and FIG. 3b, the current mirror circuit 41 may specifically include: a second switching transistor M2, a third switching transistor M3, a fourth switching transistor M4, a fifth switching transistor M5, a first switch S1, a second capacitor C2, and a comparator AO.

The first electrode of the second switching transistor M2 is electrically connected to the second electrode D of the driving transistor M0 as an input end of the current mirror circuit 41, and the gate of the second switching transistor M2 is electrically connected to the output end of the comparator AO, and second. The second electrode of the second switching transistor M2 is electrically connected to the gate and first electrode of the third switching transistor M3.

The second electrode of the third switching transistor M3 is electrically connected to the ground GND.

The gate of the fourth switching transistor M4 is electrically connected to the output end of the comparator AO, and the first electrode of the fourth switching transistor M4 is electrically connected to the first input end of the current comparing circuit 43 as the output end of the current mirror circuit 41. The second electrode of the four switching transistor M4 is electrically connected to the first electrode of the fifth switching transistor M5.

The gate of the fifth switching transistor M5 is electrically connected to the gate of the third switching transistor M3, and the second electrode of the fifth switching transistor M5 is electrically connected to the ground GND.

The first input end of the comparator AO is electrically connected to the first electrode of the second switching transistor M2 and the first end of the first switch S1, respectively, and the second input end of the comparator AO is electrically connected to the second reference signal terminal Vref2.

The second end of the first switch S1 is electrically connected to the second reference signal terminal Vref2.

The first end of the second capacitor C2 is electrically connected to the first electrode of the second switching transistor M2, and the second end of the second capacitor C2 is electrically connected to the ground GND.

In an embodiment of the present disclosure, in the touch detection circuit provided by the embodiment of the present disclosure, as shown in FIG. 3a and FIG. 3b, the second switching transistor M2, the third switching transistor M3, the fourth switching transistor M4 and the fifth switching transistor M5 may be N-type transistors. Of course, the second switching transistor M2, the third switching transistor M3, the fourth switching transistor M4, and the fifth switching transistor M5 may be P-type transistors, which are not limited herein.

Specifically, in one embodiment of the present disclosure, in the touch detection circuit provided by the embodiment of the present disclosure, as shown in FIG. 3a and FIG. 3b, the current comparing circuit 43 may specifically include: a sixth switching transistor M6, a seventh switching transistor M7, an eighth switching transistor M8, a ninth switching transistor M9, a tenth switching transistor M10, an eleventh switching transistor M11, a twelfth switching transistor M12, a thirteenth switching transistor M13, a third capacitor C3, a fourth capacitor C4, a second switch S2, a third switch S3, a fourth switch S4, a fifth switch S5, a first inverter N1, and a second inverter N2.

The first end of the second switch S2 is electrically connected to the output end of the current mirror circuit 41 for receiving the magnetic detection current, and the second end of the second switch S2 is respectively electrically connected to the first end of the third switch S3 and the first end of the third capacitor C3. The second end of the third capacitor C3 is electrically connected to the ground GND, and the second end of the third switch S3 is electrically connected to the second reference signal terminal Vref2.

The gate of the sixth switching transistor M6 is electrically connected to the first control signal terminal EN1, the first electrode of the sixth switching transistor M6 is electrically connected to the third reference signal terminal Vref3, and the second electrode of the sixth switching transistor M6, the first electrode of the seventh switching transistor M7 and the first electrode of the ninth switching transistor M9 are electrically connected.

The gate of the seventh switching transistor M7 is electrically connected to the gate of the eighth switching transistor M8 and the first end of the fifth switch S5 respectively, and the second electrode of the seventh switching transistor M7 is electrically connected to the first electrode of the eighth switching transistor M8 and the input end of the first inverter N1, respectively.

The second end of the fifth switch is electrically connected to the first end of the fourth switch S4 and the first end of the fourth capacitor C4 respectively. The second end of the fourth switch S4 is electrically connected to the second reference signal terminal Vref2, and the second end of C4 is electrically connected to the ground GND.

The second electrode of the eighth switching transistor M8 is electrically connected to the second electrode of the tenth switching transistor M10.

The gate of the ninth switching transistor M9 is electrically connected to the gate of the tenth switching transistor M10 and the first terminal of the third capacitor C3, respectively. The second electrode of the ninth switching transistor M9 is electrically connected to the first electrode of the tenth switching transistor M10 and the input end of the second inverter N2, respectively.

The gate of the eleventh switching transistor M11 is electrically connected to the reset signal terminal Reset and the gate of the twelfth switching transistor M12, respectively. The first electrode of the eleventh switching transistor M11 is electrically connected to the input end of the first inverter N1. The second electrode of the eleventh switching transistor M11 is electrically connected to the ground GND.

The first electrode of the twelfth switching transistor M12 is electrically connected to the input end of the second inverter N2, and the second electrode of the twelfth switching transistor M12 is electrically connected to the ground GND.

The gate of the thirteenth switching transistor M13 is electrically connected to the second control signal terminal EN2, the first electrode of the thirteenth switching transistor M13 is electrically connected to the second electrode of the eighth switching transistor M8, and the second electrode of the thirteenth switching transistor M13 is electrically connected to the ground GND.

The output end of the first inverter N1 is electrically connected to the microprocessor 44 for outputting the first output signal and the third output signal.

The output end of the second inverter N2 is electrically connected to the microprocessor 44 for outputting the second output signal and the fourth output signal.

In an embodiment of the present disclosure, in the touch detection circuit provided by the embodiment of the present disclosure, the current comparing circuit 43 may further include: a fourteenth switching transistor M14. The gate of the fourteenth switching transistor M14 is electrically connected to the reset signal terminal Reset, the first electrode of the fourteenth switching transistor M14 is electrically connected to the second electrode of the eleventh switching transistor M11, and the second electrode of the fourteenth switching transistor M14 is electrically connected to the second electrode of the twelfth switching transistor M12.

In an embodiment of the present disclosure, in the touch detection circuit provided by the embodiment of the present disclosure, as shown in FIG. 3a and FIG. 3b, the sixth switching transistor M6, the seventh switching transistor M7, and the ninth switching transistor M9 may be P-type transistors. The eighth switching transistor M8, the tenth switching transistor M10, the eleventh switching transistor M11, the twelfth switching transistor M12, the thirteenth switching transistor M13, and the fourteenth switching transistor M14 may be N-type transistors. Of course, the sixth switching transistor M6 may also be an N-type transistor, and the eleventh switching transistor M11, the twelfth switching transistor M12, the thirteenth switching transistor M13, and the fourteenth switching transistor M14 may also be P-type transistors, which are not limited herein.

In an embodiment of the present disclosure, in the touch detection circuit provided by the embodiment of the present disclosure, the signal of the first control signal terminal EN1 and the signal of the second control signal terminal EN2 are opposite in phase. Of course, when the sixth switching transistor M6 and the thirteenth switching transistor M13 are both N-type transistors or both P-type transistors, the first control signal terminal EN1 and the second control signal terminal EN2 may be the same signal terminal, which are not limited herein.

In an embodiment of the present disclosure, in the touch detection circuit provided by the embodiment of the present disclosure, the first switch S1, the third switch S3, and the fourth switch S4 are turned on under the control of the same signal. The second switch S2 and the fifth switch S5 are turned on under the control of the same signal.

In an embodiment of the present disclosure, in the touch detection circuit provided by the embodiment of the present disclosure, the first reference signal terminal Vref1 and the third reference signal terminal Vref3 may be the same signal terminal.

In an embodiment of the present disclosure, in the touch detection circuit provided by the embodiment of the present disclosure, each of the switching transistors provides a signal of its first electrode to its second electrode when the transistor is in an on state with a signal on its gate. Moreover, each of the switching transistors can be transistors of the same material.

Specifically, in an embodiment according to the present disclosure, the N-type transistor is turned on under the action of the high electric level, and is turned off under the action of the low electric level; the P-type transistor is turned off under the action of the high electric level, and is turn on under the action of the low electric level.

It should be noted that the driving transistors and the switching transistors mentioned in the above embodiments provided by the present disclosure may be thin film transistors (TFT) or metal oxide semiconductor (MOS) field effect transistors. It is not limited herein. In a specific implementation, the first electrode and the second electrode of the switching transistors may use the first electrode as the source or the drain of the switching transistor and the second electrode as the drain or source of the switching transistor according to the type of the switching transistor and the signal of the signal terminal, and are not limited herein.

The working process of the touch detection circuit provided by the embodiment of the present disclosure is: in the magnetic touch phase, when the magnetic sensing circuit 10 senses an external magnetic field, an electromagnetic induction voltage related to the direction of the magnetic field is generated; the voltage input circuit 20 provides the signal of the first reference signal terminal Vref1 to the first electrode S of the driving transistor M0 under the control of the scanning signal terminal Scan; the voltage storage circuit 30 supplies a preset voltage to the gate G of the driving transistor M0; the driving transistor M0 outputs an magnetic detection current related to the voltage of the gate of the driving transistor M0; the data processing circuit 40 determines an magnetic touch position according to the comparison between the preset current and the received magnetic detection current.

In the pressure sensing touch phase, when the piezoelectric sensing structure is deformed by pressure, a pressure induced voltage for controlling the threshold voltage of the driving transistor M0 is generated along the pressure direction; the voltage input circuit 20 provides the signal of the first reference signal terminal Vref1 to the first electrode S of the driving transistor M0 the under the control of the scanning signal terminal Scan; the voltage storage circuit 30 supplies a preset voltage to the gate G of the driving transistor M0; the driving transistor M0 outputs a pressure sensing detection current related to the threshold voltage of the driving transistor M0. The data processing circuit 40 recognizes the pressure based on the comparison between the preset current and the received pressure sensing detection current.

The working process of the touch detection circuit provided by the embodiment of the present disclosure is described below with reference to the circuit timing diagram. In this example, the first reference signal terminal Vref1 and the third reference signal terminal Vref3 are the same signal terminal. In the following description, a high electric level signal is indicated by 1 and a low electric level signal is indicated by 0.1 and 0 represent their logic electric levels, only to better explain the working process of the above-described touch detection circuit provided by the embodiments of the present disclosure, rather than the specific electric levels applied to the gates of the switching transistors.

Figure 4:
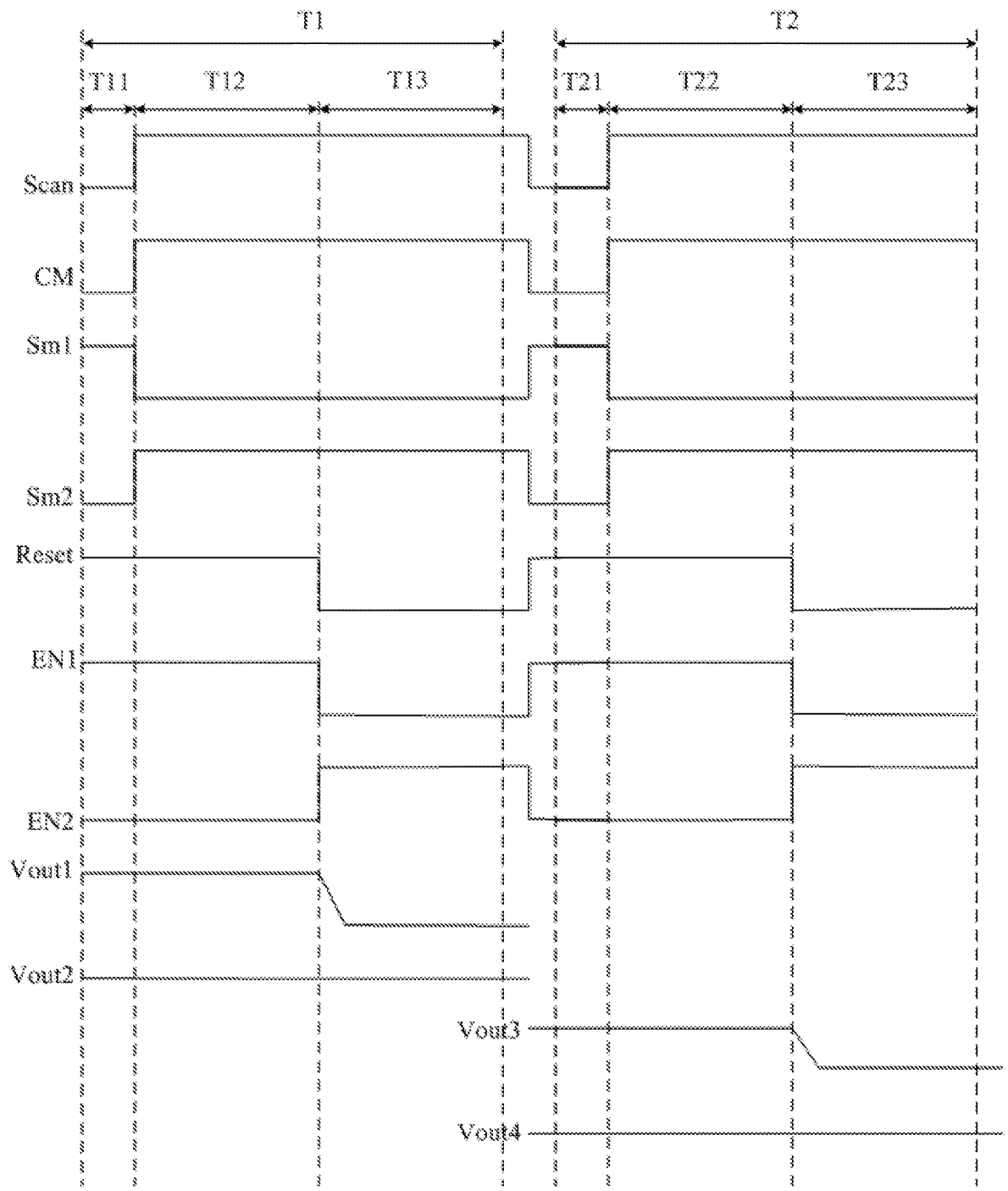

Taking the structure of the touch detection circuit shown in FIG. 3a as an example, the corresponding input and output timing diagram is shown in FIG. 4. Specifically, three stages of T11, T12 and T13 in the magnetic touch phase T1 and three stages of T21, T22 and T23 in the pressure sensing touch phase T2 in FIG. 4 are selected. The signal Sm1 is configured to control the first switch S1, the third switch S3, and the fourth switch S4, and the signal Sm2 is configured to control the second switch S2 and the fifth switch S5.

In stage T11 of the magnetic touch phase T1, Scan=0, CM=0, Sm1=1, Sm2=0, Reset=1, EN1=1, EN2=0. At this time, the pre-charge signal terminal CS has a voltage signal of a preset voltage $V_0$.

Since Scan=0, the first switching transistor M1 is turned off. Since the pre-charge signal terminal CS has a voltage signal of a preset voltage $V_0$, both the first end of the first capacitor C1 and the gate G of the driving transistor are charged with the preset voltage $V_0$. Since Sm2=0, the second switch S2 is disconnected from the fifth switch S5. Since Sm1=1, the first switch S1, the third switch S3, and the fourth switch S4 are all closed, and the second capacitor C2, the third capacitor C3 and the fourth capacitor C4 are all charged to the voltage $V_{ref2}$ of the second reference signal terminal Vref2. Thereby, the voltages in the second capacitor C2, the third capacitor C3, and the fourth capacitor C4 are reset, and the voltage $V_{C3}$ of the third capacitor C3 is equal to the voltage $V_{C4}$ of the fourth capacitor C4. Since EN1=1, the sixth switching transistor M6 is turned off. Since EN2=0, the thirteenth switching transistor M13 is turned off. Since reset=1, the eleventh switching transistor M11, the twelfth switching transistor M12, and the fourteenth switching transistor M14 are all turned on, and the low electric level signal of the ground GND is respectively supplied to the input ends of the first inverter N1 and the second inverter N2, such that the output end of the first inverter N1 outputs a first output signal Vout1 of a high electric level, and the output end of the second inverter N2 outputs a second output signal Vout2 of a high electric level.

In stage T12, Scan=1, CM=1, Sm1=0, Sm2=1, Reset=1, EN1=1, EN2=0, and at this time, the pre-charge signal terminal CS has no signal.

Since Sm2=1, both the second switch S2 and the fifth switch S5 are closed. Since Sm1=0, the first switch S1, the third switch S3, and the fourth switch S4 are all opened. Since Scan=1, the first switching transistor M1 is turned on and supplies the signal of the first reference signal terminal Vref1 to the first electrode S of the driving transistor M0, and the voltage of the first electrode S of the driving transistor M0 is $V_{ref1}$. The first capacitor C1 supplies a preset voltage V0 to the gate G of the driving transistor M0, such that the driving transistor M0 is turned on and outputs a current $I_0$ to the current mirror circuit 41, wherein $I_0=K[V_{gs}(M0)-V_{th}(M0)]^2=K[V_0-V_{ref1}-V_{th}(M0)]^2$. The output end of the current mirror circuit 41 outputs a current $I_0'$ of the same magnitude of $I_0$ but in opposite direction. That is, the current comparing circuit 43 flows the current $I_0'$ to the current mirror circuit 41. Since CM=1, the constant current source circuit 42 inputs the preset current $I_{ref}$ to the current comparing circuit 43, and the voltage of the third capacitor $$V_{c3} = V_{ref2} + \frac{(I_0' - I_{ref})T}{c3};$$

where T represents the charging time and c3 represents the capacitance value of the third capacitor C3. Since $I_0'$ and $I_{ref}$ are of the same magnitude but opposite directions, the voltage of the third capacitor C3 remain the same, $V_{C3}=V_{C4}$. Since EN1=1, the sixth switching transistor M6 is turned off. Since EN2=0, the thirteenth switching transistor M13 is turned off. Since Reset=1, the eleventh switching transistor M11, the twelfth switching transistor M12, and the fourteenth switching transistor M14 are all turned on, and the low electric level signal of the ground GND is respectively supplied to the input ends of the first inverter N1 and the second inverter N2, such that the output end of the first inverter N1 outputs a first output signal Vout1 of a high electric level, and the output end of the second inverter N2 outputs a second output signal Vout2 of a high electric level.

In stage T13, Scan=1, CM=1, Sm1=0, Sm2=1, Reset=0, EN1=0, EN2=1, at this time, the pre-charge signal terminal CS has no signal.

Since Sm2=1, both the second switch S2 and the fifth switch S5 are closed. Since Sm1=0, the first switch S1, the third switch S3, and the fourth switch S4 are all opened. Since EN1=0, the sixth switching transistor M6 is turned on, and the third reference signal terminal Vref3 is connected to the seventh switching transistor M7 and the ninth switching transistor M9, respectively. Since EN2=1, the thirteenth switching transistor M13 is turned on, and the ground GND is connected to the eighth switching transistor M8 and the tenth switching transistor M10. Since Reset=0, the eleventh switching transistor M11, the twelfth switching transistor M12, and the fourteenth switching transistor M14 are all turned off. Since Scan=1, the first switching transistor M1 is turned on and supplies the signal of the first reference signal terminal Vref1 to the first electrode S of the driving transistor M0, and the voltage of the first electrode S of the driving transistor M0 is $V_{ref1}$. The first capacitor C1 supplies a preset voltage $V_0$ to the gate G of the driving transistor M0. The direction of the external magnetic field sensed by the magnetic sensing plate P is perpendicular and directed outward from the magnetic sensing plate P. The magnetic sensing plate P generates an induced electromotive force $V_E$ in the same direction as that of the gate voltage of the driving transistor M0, and the generated induced electromotive force $V_E$ is supplied to the gate G of the driving transistor M0, so that the gate voltage of the driving transistor M0 is $V_0+V_E$. The driving transistor M0 is turned on and outputs a current $I_1=K[V_{gs}(M0)-V_{th}(M0)]^2=K[V_0+V_E-V_{ref1}-V_{th}(M0)]^2$ to the input end of the current mirror circuit 41. The output end of the current mirror circuit 41 outputs a current of the same magnitude but opposite direction as $I_1$, that is, the current comparing circuit 43 flows the current to the current mirror circuit 41. Since CM=1, the constant current source circuit 42 inputs the preset current $I_{ref}$ to the current comparing circuit 43, and the voltage of the third capacitor C3 is $$V_{c3} = V_{ref2} + \frac{(I'_1 - I_{ref})T}{c3};$$

where T represents the charging time and c3 represents the capacitance value of the third capacitor C3. Since $I_1'>I_{ref}$, the voltage of the third capacitor C3 increases, so that $V_{C3}>V_{C4}$. Therefore, the pull-down speeds of the ninth switching transistor M9 and the tenth switching transistor M10 are greater than the pull-down speeds of the seventh switching transistor M7 and the eighth switching transistor M8, so that the output end of the second inverter N2 outputs a second output signal Vout2 of a high electric level, and the output end of the first inverter N1 outputs a first output signal Vout1 of low electric level.

Of course, in stage T13 of the magnetic touch phase T1, the direction of the external magnetic field sensed by the magnetic sensing plate P is perpendicular and directed toward the magnetic sensing plate P, and the magnetic sensing plate P generates an induced electromotive force $V_E'$ in a direction opposite to that of the gate voltage of the driving transistor M0. The generated induced electromotive force VE is supplied to the gate G of the driving transistor M0, and the gate voltage of the driving transistor M0 is $V_0-V_E'$. The driving transistor M0 outputs a current I3 to the current mirror circuit 41, wherein $I_3=K[V_{gs}(M0)-V_{th}(M0)]^2=K[V_0-V_E'-V_{ref1}-V_{th}(M0)]^2$. The output end of the current mirror circuit 41 outputs a current $I_3'$ of the same magnitude but opposite direction as $I_3$, i.e., the current comparing circuit 43 flows the current $I_3'$ to the current mirror circuit 41. Since CM=1, the constant current source circuit 42 inputs the preset current $I_{ref}$ to the current comparing circuit 43, and the voltage of the third capacitor C3 is $$V_{c3} = V_{ref2} + \frac{(I'_3 - I_{ref})T}{c3};$$

where T represents the charging time, and c3 represents the capacitance value of the third capacitor C3. Since $I_3'<I_{ref}$, the voltage of the third capacitor C3 is lowered, so that $V_{C3}<V_{C4}$. Therefore, the pull-down speeds of the seventh switching transistor M7 and the eighth switching transistor M8 is greater than the pull-down speeds of the ninth switching transistor M9 and the tenth switching transistor M10, so that the output end of the first inverter N1 outputs a first output signal of a high electric level, the output end of the second inverter N2 outputs a second output signal of a low electric level.

Therefore, in the magnetic touch phase, when the first output signal Vout1 is at a low electric level and the second output signal Vout2 is at a high electric level, the microprocessor 44 can determine that the direction of the magnetic field is perpendicular and directed outward from the magnetic sensing plate; and when the first output signal Vout1 is at a high electric level and the second output signal Vout2 is at a low electric level, the microprocessor 44 can determine that the direction of the magnetic field is perpendicular and pointed toward the magnetic sensing plate. Thus, the direction of the magnetic field can be determined, and two kinds of touch instructions can be realized.

In stage T21 of the pressure sensing touch phase T2, since Scan=0, CM=0, Sm1=1, Sm2=0, Reset=1, EN1=1, EN2=0, at this time, the pre-charge signal terminal CS has a voltage signal of a preset voltage $V_0$. Therefore, the working process at this stage is substantially the same as that of the stage T11 in the magnetic touch phase T1, and will not be described in detail herein.

In stage T22, since Scan=1, CM=1, Sm1=0, Sm2=1, Reset=1, EN1=1, EN2=0, at this time, the pre-charge signal terminal CS has no signal. Therefore, the working process at this stage is substantially the same as that of the stage T12 in the magnetic touch phase T1, and will not be described in detail herein.

In stage T23, Scan=1, CM=1, Sm1=0, Sm2=1, Reset=0, EN1=0, EN2=1. At this time, the pre-charge signal terminal CS has no signal.

Since Sm2=1, both the second switch S2 and the fifth switch S5 are closed. Since Sm1=0, the first switch S1, the third switch S3, and the fourth switch S4 are all opened. Since EN1=0, the sixth switching transistor M6 is turned on, and the third reference signal terminal Vref3 is connected to the seventh switching transistor M7 and the ninth switching transistor M9, respectively. Since EN2=1, the thirteenth switching transistor M13 is turned on, and the ground GND is connected to the eighth switching transistor M8 and the tenth switching transistor M10. Since Reset=0, the eleventh switching transistor M11, the twelfth switching transistor M12, and the fourteenth switching transistor M14 are all turned off. Since Scan=1, the first switching transistor M1 is turned on and supplies the signal of the first reference signal terminal Vref1 to the first electrode S of the driving transistor M0, and the voltage of the first electrode S of the driving transistor M0 is $V_{ref1}$, and the first capacitor C1 supplies a preset voltage $V_0$ to the gate G of the driving transistor M0. The piezoelectric sensing structure is deformed when subjected to a pressure, thereby reducing the threshold voltage $V_{th}(M0)$ of the driving transistor M0 to $V_{th}'(M0)$. Therefore, the driving transistor M0 outputs a current $I_2=K[V_{gs}(M0)-V_{th}'(M0)]^2=K[V_0-V_{ref1}-V_{th}'(M0)]^2$ to the input end of the current mirror circuit 41. The output end of the current mirror circuit 41 outputs a current $I_2'$ having the same magnitude but in opposite direction as $I_2$, that is, the current comparing circuit 43 flows the current $I_2'$ to the current mirror circuit 41. Since CM=1, the constant current source circuit 42 inputs the preset current $I_{ref}$ to the current comparing circuit 43, and the voltage of the third capacitor C3 is $$V_{c3} = V_{ref2} + \frac{(I'_2 - I_{ref})T}{c3};$$

where T represents the charging time, and c3 represents the capacitance value of the third capacitor C3. Since $I_2'>I_{ref}$, the voltage of the third capacitor C3 increases, so that $V_{C3}>V_{C4}$. Therefore, the pull-down speeds of the ninth switching transistor M9 and the tenth switching transistor M10 is greater than the pull-down speeds of the seventh switching transistor M7 and the eighth switching transistor M8, so that the output end of the first inverter N1 outputs a third output signal Vout3 of a low electric level, and the output end of the second inverter N2 outputs a fourth output signal Vout4 of a high electric level.

Therefore, in the pressure sensing touch phase, the microprocessor 44 can recognize the pressure when the third output signal Vout3 is at a low electric level and the fourth output signal Vout4 is at a high electric level, thereby realizing a pressure sensing touch function.

The touch detection circuit provided by the embodiment of the present disclosure can not only support the magnetic touch function based on the electromagnetic induction principle, but also support the pressure sensing touch function based on the pressure sensing technology, so that the magnetic touch detection circuit and the pressure sensing device and the pressure sensing detection circuit can be integrated in a touch detection circuit, and reducing the excessive space in the display device occupied by the pressure sensing device and the pressure sensing detection circuit.

Based on the same inventive concept, the embodiment of the present disclosure further provides a method for driving the above-mentioned touch detection circuit provided by the embodiment of the present disclosure. As shown in FIG. 5, the method includes: a magnetic touch phase and a pressure sensing touch phase.

S501. In the magnetic touch phase, when the magnetic sensing circuit senses an external magnetic field, the magnetic sensing circuit generates a magnetic sensing voltage related to a direction of the magnetic field; the voltage input circuit supplies the signal of the first reference signal terminal to a first electrode of the driving transistor under the control of the scanning signal terminal; the voltage storage circuit provides a preset voltage to the gate of the driving transistor; the driving transistor outputs a magnetic detection current related to the voltage of the gate of the driving transistor; and the data processing circuit determines the magnetic touch position according to the comparison between the preset current and the received magnetic detection current.

S502. In the pressure sensing touch phase, when the piezoelectric sensing structure is deformed by a pressure, a pressure induced voltage for controlling a threshold voltage of the driving transistor is generated along the pressure direction; the voltage input circuit supplies the signal of the first reference signal terminal to the first electrode of the driving transistor under the control of the scanning signal terminal; the voltage storage circuit supplies a preset voltage to the gate of the driving transistor; the driving transistor outputs a pressure sensing detection current corresponding to the threshold voltage of the driving transistor; and the data processing circuit recognizes the pressure according to the comparison between the preset current and the received pressure sensing detection current.

The driving method provided by the embodiment of the present disclosure can not only support the magnetic touch function based on the electromagnetic induction principle, but also support the pressure sensing touch function based on the pressure sensing technology, so that the magnetic touch detection circuit, the pressure sensing device and the pressure sensing detection circuit can be integrated in a touch detection circuit, thereby reducing the excessive space of the display device occupied by the pressure sensing device and the pressure sensing detection circuit.

Based on the same inventive concept, an embodiment of the present disclosure further provides an embedded touch panel, including any of the above-described touch detection circuits provided by the embodiments of the present disclosure. The principle of the embedded touch panel is similar to that of the touch detection circuit. Therefore, the implementation of the embedded touch panel can be referred to the implementation of the above touch detection circuit, and is not repeated herein.

Based on the same inventive concept, an embodiment of the present disclosure further provides a display device, including the above-described embedded touch panel provided by an embodiment of the present disclosure. The display device can be any product or component having a display function, such as a mobile phone, a tablet, a television, a display, a notebook computer, a digital photo frame, a navigator, and the like. Other indispensable components of the display device are understood by those skilled in the art, and are not described herein, nor should they be construed as limiting the disclosure. For the implementation of the display device, reference may be made to the embodiment of the touch detection circuit described above, and is not repeated herein.

Embodiments of the present disclosure provide a touch detection circuit and a driving method thereof, and an embedded touch panel and a display device using the touch detection circuit. The touch detection circuit according to an embodiment of the present disclosure may include: a magnetic sensing circuit, a voltage input circuit, a voltage storage circuit, a piezoelectric sensing structure, a driving transistor of bottom gate type, and a data processing circuit; wherein the piezoelectric sensing structure is located at a side of the active layer of the driving transistor facing away from the gate of the driving transistor, and the piezoelectric sensing structure is configured to generate a pressure induced voltage along the pressure direction for controlling the threshold voltage of the driving transistor when the piezoelectric sensing structure is pressed and deformed during the pressure sensing touch phase. The magnetic sensing circuit is configured to generate an electromagnetic induction voltage related to the direction of the magnetic field when magnetic sensing circuit senses the external magnetic field during the magnetic touch phase; the voltage input circuit is configured to provide a signal of the first reference signal terminal to the first electrode of the driving transistor under the control of the scanning signal terminal during the magnetic touch phase and the pressure sensing touch phase; the voltage storage circuit is configured to provide a preset voltage to the gate of the driving transistor during the magnetic touch phase and the pressure sensing touch phase; the driving transistor is configured outputs an magnetic detection current associated with the voltage of the gate of the drive transistor during the magnetic touch phase, and output a pressure sensing detection current related to a threshold voltage of the driving transistor during the pressure sensing touch phase; the data processing circuit is configured to determine the magnetic touch position according to the comparison between the preset current and the received magnetic detection current during the magnetic touch phase, and recognize the pressure according to the comparison between the preset current and the received pressure sensing detection current during the pressure sensing touch phase. Therefore, the touch detection circuit, the driving method thereof, the embedded touch panel and the display device provided by the embodiments of the present disclosure can not only support the magnetic touch function based on the electromagnetic induction principle but also support pressure sensing touch function based on the pressure sensing technology by the cooperation of the above circuits and the structures. The magnetic touch detecting circuit, the pressure sensing device and the pressure sensing detection circuit can be integrated in one touch detecting circuit, thereby reducing the excessive space of the display device occupied by the pressure sensing device and the pressure sensing detection circuit.

It will be apparent to those skilled in the art that various modifications and changes can be made in the present disclosure without departing from the spirit and scope of the disclosure. Thus, it is intended that the present invention cover the modifications and the modifications if they are within the scopes of the claims of the present disclosure and the equivalents thereof.

What is claimed is:

1. A touch detection circuit comprising:
   a driving transistor of bottom gate type, including a gate, a first electrode and a second electrode, wherein the second electrode outputs an magnetic detection current related to a voltage of the gate of the driving transistor during a magnetic touch phase, and outputs a pressure sensing detection current associated with a threshold voltage of the drive transistor during a pressure sensing touch phase;
   a piezoelectric sensing structure located on a side of an active layer of the driving transistor facing away from the gate of the driving transistor, wherein the piezoelectric sensing structure is configured to generate a pressure induced voltage, along a direction of a pressure, for controlling a magnitude of the threshold voltage of the driving transistor when the piezoelectric sensing structure is pressed and deformed;
   a magnetic sensing circuit electrically connected to the gate of the driving transistor, and configured to generate an electromagnetic induction voltage related to a direction of an external magnetic field when the magnetic sensing circuit senses the external magnetic field;
   a voltage input circuit, configured to provide a first reference signal to the first electrode of the driving transistor;
   a voltage storage circuit electrically connected to the gate of the drive transistor, and configured to provide a preset voltage to the gate of the driving transistor; and
   a data processing circuit electrically connected to the second electrode of the driving transistor, and configured to determine an magnetic touch position according to the preset current and the magnetic detection current, and to recognize the pressure according to the preset current and the pressure sensing detection current.

2. The touch detection circuit of claim 1, wherein the data processing circuit is further configured to determine a direction of the magnetic field according to the preset current and the magnetic detection current.

3. The touch detection circuit of claim 2, wherein the data processing circuit comprises
   a current mirror circuit, configured to receive the magnetic detection current and the pressure sensing detection current, and to copy the received magnetic detection current and the pressure sensing detection current to an output end of the current mirror circuit according to a preset ratio;
   a constant current source circuit, configured to output the preset current;
   a current comparing circuit, configured to output a first output signal and a second output signal to a microprocessor according to the magnetic detection current and the preset current, and to output a third output signal and a fourth output signal to the microprocessor according to the pressure sensing detection current and the preset current; and
   the microprocessor, configured to determine an magnetic touch position and a direction of the magnetic field according to an electric level of the first output signal and an electric level of the second output signal; and to recognize the pressure according to an electric level of the third output signal and an electric level of the fourth output signal.

4. The touch detection circuit according to claim 1, wherein the voltage input circuit comprises
   a first switching transistor, configured to provide the first reference signal to the first electrode of the driving transistor under the control of a scanning signal terminal.

5. The touch detection circuit according to claim 1, wherein the voltage storage circuit comprises:
   a first capacitor, a first end of the first capacitor is electrically connected to the gate of the driving transistor and a pre-charge signal end, and a second end of the first capacitor is electrically connected to the ground, wherein the pre-charging signal terminal is configured to charge the first capacitor.

6. The touch detection circuit according to claim 1, wherein the magnetic sensing circuit comprises a magnetic sensing plate.

7. The touch detection circuit according to claim 1, wherein the piezoelectric sensing structure comprises a third electrode, a piezoelectric material layer, and a fourth electrode which are stacked.

8. The touch detection circuit according to claim 7, wherein the piezoelectric material layer generates an equal amount of different charges on the third electrode and the fourth electrode when deformed by the pressure.

9. The touch detection circuit of claim 8, wherein the greater the deformation of piezoelectric material layer is, the more charges are generated.

10. An embedded touch panel comprising the touch detection circuit according to claim 1.

11. A display device comprising the embedded touch panel of claim 10.

12. A method of driving a touch detection circuit according to claim 1, comprising:
    during the magnetic touch phase,
        generating the electromagnetic induction voltage related to the direction of the magnetic field when the magnetic sensing circuit senses the external magnetic field;
        providing, by the voltage input circuit, the first reference signal to the first electrode of the driving transistor;
        providing, by the voltage storage circuit, the preset voltage to the gate of the driving transistor;
        outputting, by the drive transistor, the magnetic detection current associated with the voltage of the gate of the driving transistor; and
        determining, by the data processing circuit, the magnetic touch position according to the preset current and the magnetic detection current; and
    during the pressure sensing touch phase,
        generating a pressure induced voltage for controlling the threshold voltage of the driving transistor in the direction of the pressure when the piezoelectric sensing structure is deformed by the pressure;

providing, by the voltage input circuit, the first reference signal to the first electrode of the driving transistor;
providing, by the voltage storage circuit, the preset voltage to the gate of the driving transistor;
outputting, by the drive transistor, the pressure sensing detection current associated with the threshold voltage of the driving transistor; and
recognizing, by the data processing circuit, the pressure based on the preset current and the pressure sensing detection current.

* * * * *